United States Patent
Ishikawa et al.

(10) Patent No.: US 9,834,249 B2
(45) Date of Patent: Dec. 5, 2017

(54) VEHICLE WITH STEERING DEVICES FOR FRONT AND REAR WHEELS

(71) Applicant: NTN CORPORATION, Osaka (JP)

(72) Inventors: Tomomi Ishikawa, Shizuoka (JP); Kazuyuki Inokuchi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/034,665

(22) PCT Filed: Nov. 5, 2014

(86) PCT No.: PCT/JP2014/079302
§ 371 (c)(1),
(2) Date: May 5, 2016

(87) PCT Pub. No.: WO2015/072375
PCT Pub. Date: May 21, 2015

(65) Prior Publication Data
US 2016/0280259 A1    Sep. 29, 2016

(30) Foreign Application Priority Data
Nov. 14, 2013  (JP) .................................. 2013-235721

(51) Int. Cl.
*B62D 7/15* (2006.01)
*B62D 3/12* (2006.01)
(Continued)

(52) U.S. Cl.
CPC .............. *B62D 7/1509* (2013.01); *B60K 7/00* (2013.01); *B60L 1/003* (2013.01);
(Continued)

(58) Field of Classification Search
CPC ....... B62D 7/1509; B60K 7/00; B60K 7/0007
See application file for complete search history.

(56) References Cited

U.S. PATENT DOCUMENTS 3,279,813 A * 10/1966 Linsay ................. B62D 7/1509
180/410
4,599,030 A    7/1986 Skaalen et al.
(Continued)

FOREIGN PATENT DOCUMENTS

| CN | 102933452 | 2/2013 |
|---|---|---|
| CN | 103121400 | 5/2013 |

(Continued)

OTHER PUBLICATIONS

Office Action dated Jun. 1, 2017 in Chinese Application No. 201480057492,6, with English translation.
(Continued)

*Primary Examiner* — Kevin Hurley
(74) *Attorney, Agent, or Firm* — Wenderoth, Lind & Ponack, L.L.P.

(57) ABSTRACT

A vehicle is provided of which the four wheels are steerable, and which is prevented from unexpectedly moving forward or backward when switching the travel mode. The vehicle includes a steering device for front right and front left wheels of the vehicle capable of steering the front right and front left wheels, respectively, in one and the other of the right and left directions, a steering device for rear right and rear left wheels of the vehicle configured, simultaneously when the steering device for the front right and front left wheels are actuated, to be capable of steering the rear right and rear left wheels in the other and the one of the right and left directions, respectively, and in-wheel motors provided in at least one of each of the front right and front left wheels and each of the rear right and rear left wheels.

2 Claims, 10 Drawing Sheets

(51) Int. Cl.
  *B62D 7/09* (2006.01)
  *B60L 1/00* (2006.01)
  *B60L 11/18* (2006.01)
  *B60K 7/00* (2006.01)
  *F16H 19/04* (2006.01)

(52) U.S. Cl.
  CPC ............ *B60L 11/1805* (2013.01); *B62D 3/12* (2013.01); *B62D 3/126* (2013.01); *B62D 7/09* (2013.01); *F16H 19/04* (2013.01); *B60K 2007/0092* (2013.01); *B60L 2220/44* (2013.01); *B60L 2220/50* (2013.01); *B60L 2240/12* (2013.01); *B60L 2240/24* (2013.01); *Y02T 10/641* (2013.01); *Y02T 10/7005* (2013.01)

(56) References Cited

U.S. PATENT DOCUMENTS

| | | | |
|---|---|---|---|
| 5,381,705 A | | 1/1995 | Takahashi |
| 2013/0098695 A1 | | 4/2013 | Itou et al. |
| 2013/0277935 A1 | | 10/2013 | Harris et al. |
| 2016/0167698 A1* | 6/2016 | Ooba | .................... B62D 5/0421 180/65.51 |
| 2016/0236710 A1* | 8/2016 | Ohba | ...................... F16H 19/04 |
| 2016/0288828 A1* | 10/2016 | Ohba | ....................... B62D 3/12 |

FOREIGN PATENT DOCUMENTS

| | | |
|---|---|---|
| JP | 3-112724 | 5/1991 |
| JP | 4-262971 | 9/1992 |
| JP | 2600374 | 10/1999 |
| JP | 2003-127876 | 5/2003 |
| JP | 2005-297782 | 10/2005 |
| JP | 2007-22159 | 2/2007 |
| JP | 2010-76528 | 4/2010 |
| JP | 4635754 | 12/2010 |
| WO | 2013/054357 | 4/2013 |

OTHER PUBLICATIONS

International Search Report dated Feb. 10, 2015 in corresponding International Application No. PCT/JP2014/079302 (with English translation).

Written Opinion of the International Searching Authority dated Feb. 10, 2015 in corresponding International Application No. PCT/JP2014/079302 (with English translation).

Extended European Search Report dated Oct. 7, 2016 in European Application No. 14862200.4.

H. Higasa et al., "Development of Electric Vehicle Pivot", International Electric Vehicle Symposium, Anaheim, CA, Dec. 5-7, 1994, vol. SYMP. 12, Dec. 5, 2016, pp. 429-438, XP000488444.

* cited by examiner

Fig.9
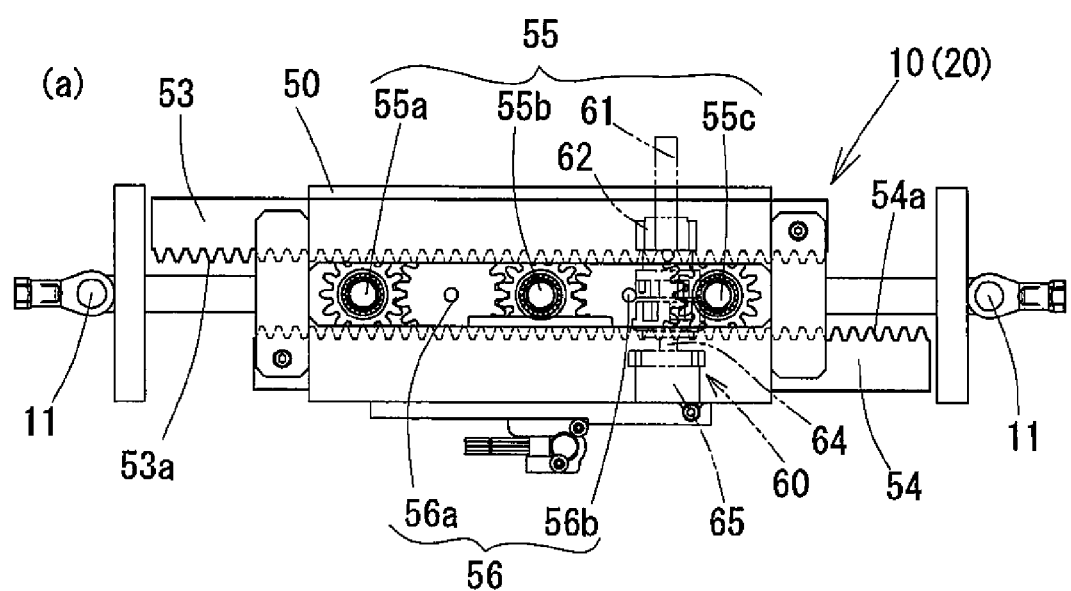
(a)
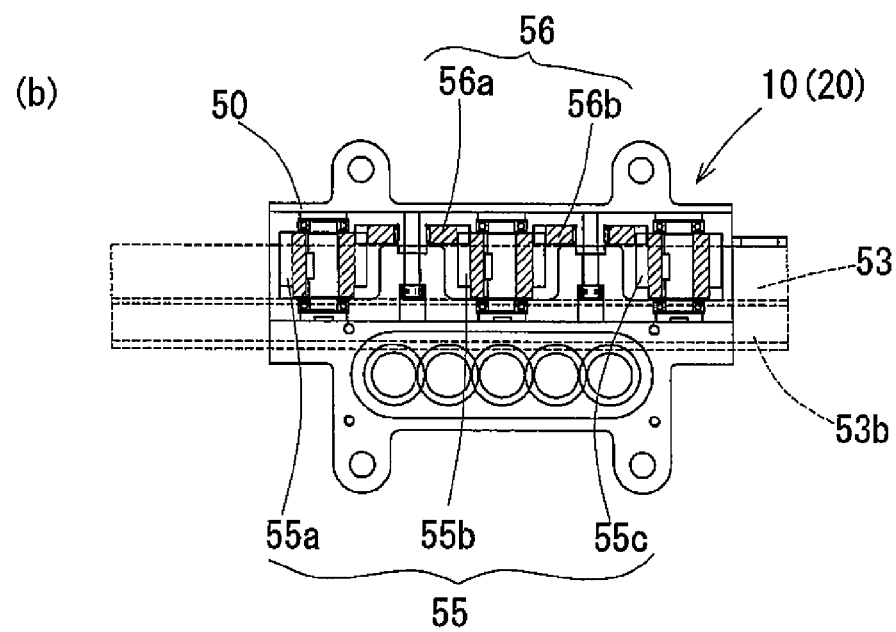
(b)

VEHICLE WITH STEERING DEVICES FOR FRONT AND REAR WHEELS

TECHNICAL FIELD

This invention relates to a vehicle, particularly a vehicle including in-wheel motors and capable of selectively performing a normal travel mode and a special travel mode such as a pivot turn mode.

BACKGROUND ART

A steering mechanism known as an Ackerman-Jeantaud steering mechanism includes a steering link mechanism connecting together right and left vehicle wheels (an assembly including a tire, a rim, a hub, an in-wheel motor, etc. is hereinafter referred to as "vehicle wheel" or simply "wheel"), and used to steer the vehicle wheels. This steering mechanism includes tie rods and knuckle arms such that while the vehicle is turning, the right and left wheels move around the same center point.

Such steering mechanisms include one disclosed in the below-identified Patent document 1. This steering mechanism includes at least one steering linkage mechanism provided for the front right and front left wheels or the rear right and rear left wheels, and includes tie rods and knuckle arms. This steering mechanism further includes an actuator capable of changing the lengths of the tie rods, the distance between the right and left tie rods, or the angle formed between each wheel and the knuckle arm, whereby the vehicle can smoothly travel in all of the normal travel mode, a parallel travel mode and a pivot turn mode.

The below-identified Patent document 2 discloses a steering mechanism including steering shafts disposed, respectively, between the front right and front left wheels and between the rear right and rear left wheels so as to be rotatable about their own axes. Each steering shaft comprises right and left separate portions between which is disposed a normal and reverse rotation switching means for switching the rotational direction of the steering shaft. The normal and reverse rotation switching means allows 90-degree steering, lateral movement of the vehicle, etc.

The below-identified Patent document 3 discloses a four-wheel steering vehicle including an actuator actuated when the front wheels are steered such that the rear wheels are steered. The below-identified Patent document 4 discloses a steering mechanism capable of performing toe adjustment of right and left wheels by moving a rack housing connecting together the right and left wheels in the fore-and-aft direction, thereby improving travel stability.

The below-identified Patent document 5 discloses a steering mechanism including two rack bars movable to right and left independently of each other, and connected, respectively, to right and left wheels through tie rods. This steering mechanism further includes a synchronizing gear box in which is retained a synchronizing gear which allows the rack bars to move in opposite directions relative to the synchronizing gear box. The steering mechanism further includes two pinion gears meshing with the respective rack bars, and a coupling mechanism disposed between the pinion gears and capable of selectively coupling and uncoupling rotary shafts of the pinion gears. When the coupling mechanism is coupled, the rack bars are fixed to each other such that the rack bars move in the same direction by the same distance, so that the right and left wheels can be steered in the same direction. When the coupling mechanism is uncoupled, the rack bars are moved in opposite directions to each other by the same distance, so that the right and left wheels can be steered in opposite directions to each other.

PRIOR ART DOCUMENTS

Patent document 1: JP Patent Publication 04-262971A
Patent document 2: JP Patent 4635754B
Patent document 3: JP Utility Model Registration 2600374
Patent document 4: JP Patent Publication 2003-127876A
Patent document 5: JP Patent Application 2013-158876 (not published)

An ordinary Ackerman-Jeantaud steering mechanism allows smooth normal travel because, during normal traveling, the lines perpendicular, in plan view, to the lines of rotation of the respective wheels (widthwise center lines of the wheels) converge on the center of turning of the vehicle. However, even if it is desired to move the vehicle laterally (parallel movement in the lateral direction with respect to the fore-and-aft direction of the vehicle), it is difficult to steer the wheels in the direction perpendicular to the fore-and-aft direction of the vehicle due to the lengths of the steering links and interference with other members. Also, even if one of the right and left wheels is steered by 90 degrees, the one and the other of the right and left wheels never becomes completely parallel to each other, thus making smooth travel difficult.

With this type of vehicle, the front wheels are ordinarily steerable in a predetermined moving direction of the vehicle as the main steered wheels, and the rear wheels, as the auxiliary steered wheels, are arranged parallel to the fore-and-aft direction of the vehicle. Thus, when the front wheels of the vehicle are steered and turned, the circles on which the front wheels pass do not coincide with the circles on which the rear wheels pass. That is, while the vehicle is traveling at a low speed, the circles on which the rear wheels pass are located inside of the respective circles on which the front wheels pass. On the other hand, while the vehicle is traveling at a high speed, the circles on which the front wheels pass are located inside of the respective circles on which the rear wheels pass, due to centrifugal force. This means that when the front wheels are steered in a turning direction in which the vehicle is moving, the orientation of the vehicle does not coincide with the turning direction. This problem is solved by a four-wheel steering mechanism (device), which steers not only the front wheels but also the rear wheels.

A vehicle including a four-wheel steering mechanism (known as a "4WS vehicle") is disclosed e.g. in Patent document 1, and is capable of moving in the lateral direction and small-radius turning. However, since such a conventional 4WS vehicle includes a plurality of actuators for changing the lengths of the right and left tie rods, the distance between the tie rods, and the angles between the knuckle arms and the corresponding wheels, complicated control is necessary to control these many actuators. Also, since a large number of gears are used to steer the wheels by moving the rack bars, backlashes tend to develop between the gears, thus making smooth steering of the wheels difficult.

The steering mechanism disclosed in Patent document 3 is another conventional four-wheel steering mechanism, which is capable of steering the rear wheels. However, for the same reasons as mentioned above, with this mechanism alone, the vehicle cannot travel in the lateral direction. While the steering mechanism disclosed in Patent document 4 allows toe adjustment, neither lateral travel nor small-radius turning is possible with this mechanism.

The steering mechanism disclosed in Patent document 5 was developed by the applicant in an attempt to solve the above-mentioned problems of Patent documents 1 to 4. While this mechanism is simple in structure, it allows special travel modes such as lateral traveling and small-radius turning. Especially when switching from the normal travel mode to another travel mode such as the lateral travel mode or the small-radius turning mode, the wheels are steered such that the front ends of the front wheels are moved close to each other, and the rear ends of the rear wheels are moved close to each other.

It is possible to switch to such a special travel mode by the operation of the steering by the driver alone, or by the actuation of a mode changing actuator alone, with the in-wheel motors M in the wheels w not activated. However, the wheels w can be steered more smoothly by rotating the tires T under the driving forces of the in-wheel motors M, thereby assisting in the steering of the wheels w about king pin axes P, provided, as shown in FIG. 7. The contact point P' between each king pin axis P (axis of steering) and the ground does not coincide with the center T' of the ground contact area of the tire T (scrub radius S not equal to zero). Therefore, it is possible to steer the wheels under the driving forces of the in-wheel motors M alone, with the steering not operated by a driver, and with the mode changing actuator not actuated.

If, as shown in FIG. 12, the front wheels FL and FR alone are steered so as to be switched to a special travel mode (pivot turn mode in FIG. 12) under the assistance of the in-wheel motors M, a force Fx that tends to move the vehicle forward and a force Mp that tends to steer each wheel w about the king pin axis P are applied to each front wheel FL, FR from the corresponding in-wheel motor M. If, in this state, the force Mp, which tends to steer the wheel w, is not sufficiently large depending on the road condition, whereby the force Fx, which tends to move the vehicle forward, is larger than the force Mp, the vehicle could unexpectedly move forward. While in FIG. 12, the front wheels FL and FR alone are steered, if the rear wheels RL and RR are steered with a time delay from when the front wheels FL and FR are steered too, the vehicle could move forward. When the front wheels FL and FR are steered to switch from a special travel mode to the normal travel mode, the vehicle could, conversely to the above, unexpectedly move backward.

SUMMARY OF THE INVENTION

An object of the present invention is to provide a vehicle of which the four wheels are steerable, and which is prevented from unexpectedly moving forward or backward when switching the travel mode.

In order to achieve this object, the present invention provides a vehicle comprising a first steering device for front right and front left wheels of the vehicle configured to be capable of steering the front right and front left wheels, respectively, in one and the other of right and left directions which are opposite to each other. In addition, a second steering device for rear right and rear left wheels of the vehicle configured, simultaneously when the steering device for the front right and front left wheels are actuated, steer the rear right and rear left wheels in the other and the one of the right and left directions, respectively. In-wheel motors are also provided in at least one of each of the front right and front left wheels and each of the rear right and rear left wheels.

By simultaneously actuating the steering devices for the front wheels and the rear wheels, when switching from the normal travel mode to a special travel mode such as the lateral travel mode under the assistance of the in-wheel motors, a force Fx that tends to move the vehicle forward is applied to each front wheel, while a force −Fx that, conversely to the above, tends to move the vehicle backward is applied to each rear wheel. When switching from a special travel mode to the normal travel mode, forces −Fx and Fx that are opposite in direction to the above-mentioned respective forces Fx and −Fx are applied to the front wheels and the rear wheels, respectively. In either case, since two forces that tend to move the vehicle forward and backward, respectively, are applied to each other, the two forces cancel each other, thus preventing the vehicle from unexpectedly moving forward or backward while changing the travel mode.

In this arrangement, it is most preferable to provide in-wheel motors both in the front wheels and the rear wheels so that the driving forces from the front and rear in-wheel motors are simultaneously applied to the front and rear wheels w. However, for example, in-wheel motors may be mounted in the front right and front left wheels only, with no in-wheel motors mounted in the rear right and rear left wheels. This latter arrangement is acceptable because while no driving forces are applied to the rear wheels, it is still possible, by steering the rear wheels in the opposite direction to the front wheels, to weaken the force that tends to move the vehicle forward or backward and that results from the driving forces applied from the in-wheel motors to the front wheels.

As used herein, the term "simultaneously" does not necessarily mean "completely simultaneously". For example, a slight time lag after the in-wheel motors are actuated until the wheels actually begin to rotate is considered to be within the meaning of "simultaneously". This is because the vehicle could never unexpectedly move forward or backward until the wheels actually begin to rotate. The above-mentioned time lag varies with many different factors including the magnitude of the output of the in-wheel motors.

In the above arrangement, each of the steering device for the front right and front left wheels and the steering device for the rear right and rear left wheels preferably comprises tie rods connected, respectively, to the corresponding right and left wheels, and configured to steer the respective right and left wheels, a pair of rack bars connected to the respective tie rods, a synchronizing gear meshing with the pair of rack bars such that the movement of one of the rack bars in one of the right and left directions, along which the rack teeth of the rack bars are arranged, is converted to the movement of the other of the rack bars in the other of the right and left directions through the synchronizing gear, and a rack bar moving means capable of moving the pair of rack bars in one and the other of the right and left directions, respectively. The rack bar moving means comprises a first pinion gear meshing with the first one of the rack bars, and a second pinion gear meshing with the other (second one) of the rack bars, and a coupling mechanism configured to selectively couple together the first pinion gear and the second pinion gear, and uncouple the first pinion gear and the second pinion gear from each other.

By connecting the right and left wheels to the respective rack bars, which are movable right and left independently of each other, through the tie rods, during the normal travel mode, the wheels can be steered in the same manner as with conventional steering devices by fixing the pair of rack bars to each other. It is also possible to perform various travel modes such as small-radius turning, pivot turning, and lateral traveling, by moving the rack bars in opposite directions to each other. Also, since the pair of rack bars are selectively separable from each other and can be fixed to each other, no complicated structure and control is necessary, which makes it possible to reduce the cost. In particular, in a vehicle of which all the four wheels are steerable, without using a complicated structure, it is possible to selectively steer the front and rear wheels in the same direction and in opposite directions to each other, thereby making it possible for the vehicle to move in the lateral direction or to turn with a small radius.

Advantages of the Invention

In a vehicle including steering devices capable of steering the front right and front left wheels in one and the other of the right and left directions, respectively, and steering the rear right and rear left wheels in the other and the one of the right and left directions, respectively, the steering devices for the front wheels and the rear wheels are simultaneously actuated when switching the travel mode. With this arrangement, it is possible to prevent the vehicle from unexpectedly moving forward or backward when switching the travel mode, thereby further improving safety of the vehicle.

BRIEF DESCRIPTION OF THE DRAWINGS

FIGS. 9(a) and 9(b) are a back view and a plan view, respectively, of either of the steering devices shown in FIG. 2, showing its interior.

DETAILED DESCRIPTION OF THE INVENTION

While the vehicle 1 according to the present invention may be provided with any steering devices provided such steering devices can steer the front wheels and the rear wheels simultaneously, it is especially preferable to use steering devices 10 and 20 shown in, and described with reference to, FIGS. 8(a) to 11(b). Description is now made of the operation of the steering devices 10 and 20 as mounted on the vehicle 1, and the behavior of the wheels w of the vehicle during respective travel modes.

The vehicle 1 according to the present invention includes in-wheel motors M each mounted in the wheel body of a respective one of the wheels w of the vehicle, i.e., the front right, front left, rear right and rear left wheels. The in-wheel motors M allow various travel patterns. However, the in-wheel motors of either the front wheels or the rear wheels may be omitted.

Figure 1:
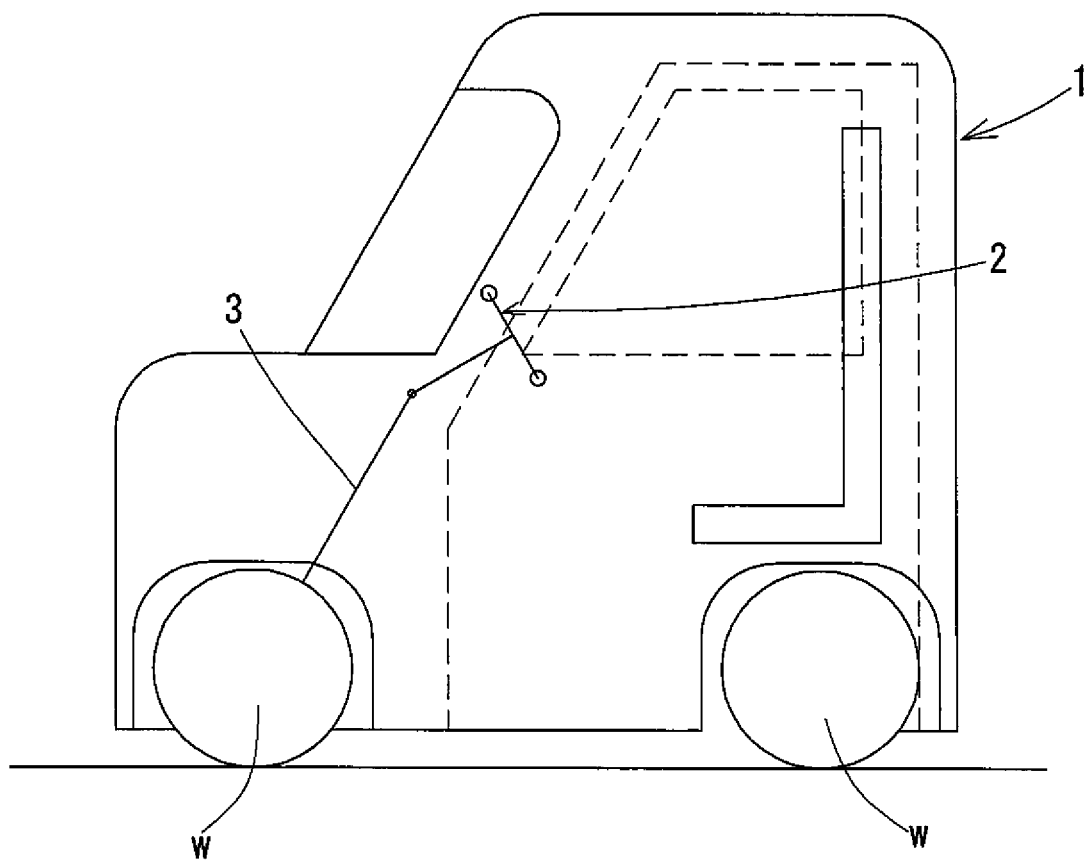
FIG. 1 shows a vehicle on which are mounted steering devices embodying the present invention.

FIG. 1 shows the vehicle 1, in which the steering devices according to the present invention are used. This vehicle 1 is an ultra-small (laterally arranged) two-seater mobility vehicle. The wheels w of this vehicle 1 are steerable by operating a steering wheel 2, thus turning a steering shaft 3 about its axis. The present invention is not only applicable to such an ultra-small mobility vehicle but also to an ordinary vehicle.

Figure 2:
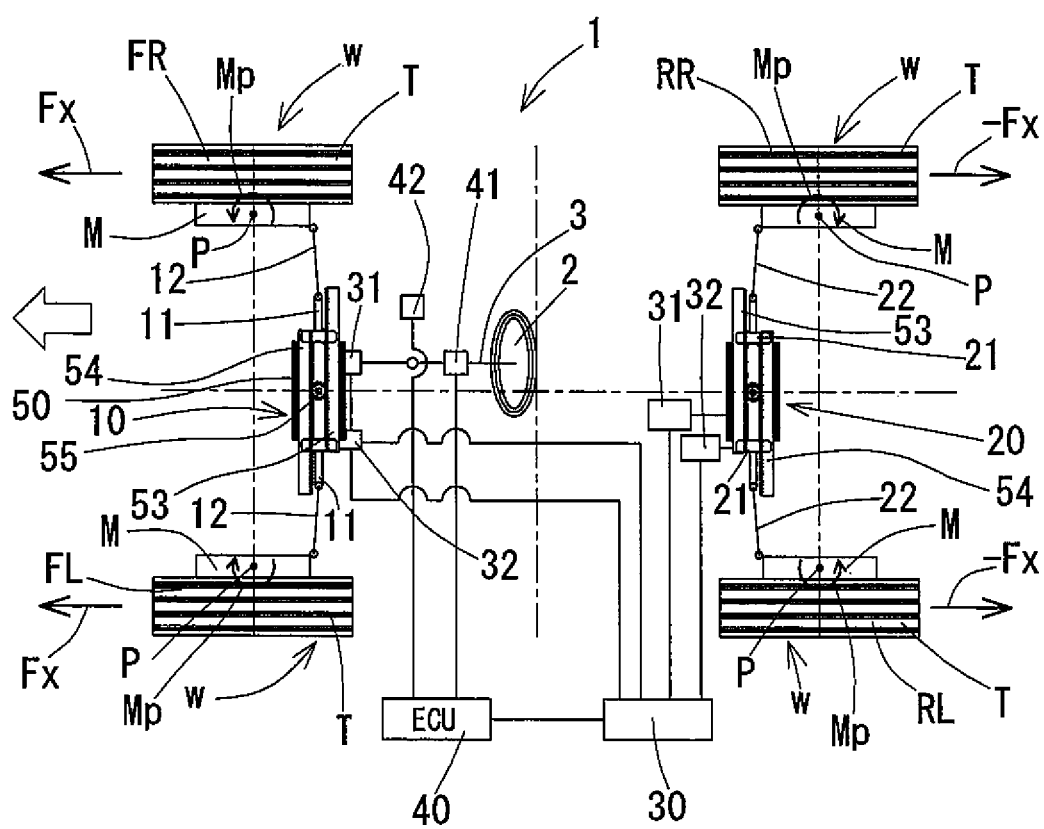
FIG. 2 is a plan view of the vehicle of FIG. 1.

FIG. 2 is a schematic plan view of the vehicle, showing its drive line and control line. In this embodiment, the steering devices 10 and 20 according to the present invention are coupled, respectively, to the front right and front left wheels FR and FL, and to the rear right and rear left wheels RR and RL, through tie rods 12 and 22.

The vehicle includes a four-wheel steering mechanism which, when the steering 2 is operated, allows the first steering device 10 for the front wheels to steer the front wheels in a normal manner, and allows the second steering device 20 for the rear wheels to steer the rear wheels according to the travel mode, through an actuator such as a motor. When the wheels w are steered in this manner by operating the steering wheel 2 and actuating the actuator, the in-wheel motors M of the respective wheels w are also activated to assist in the steering of the respective wheels w about king pin axes P by rotating the tires T under the driving forces of the in-wheel motors M. It is also possible to steer the wheels under the driving forces of the respective in-wheel motors M alone, without a driver operating the steering wheel 2 or without actuating the above actuator.

One of the steering devices 10 and 20 may be omitted. If the steering device 10 for the front wheels is omitted, an ordinary steering device may be used instead of the steering device 10.

Each of the first steering device 10 for the front wheels and the second steering device 20 for the rear wheels includes two rack bars, i.e., a first rack bar 53 connected to the left (with respect to the fore-and-aft direction of the vehicle) wheel w, and a second rack bar 54 connected to the right wheel w. In each of FIGS. 2 to 6, the arrow on its left-hand side indicates the forward direction of the vehicle. Travel modes shown in FIGS. 3 to 6 will be described later.

For each of the steering devices 10 and 20, connecting members 11 and 21 of the rack bars 53 and 54 are connected to the right and left wheels w through the respective tie rods 12 and 22. Knuckle arms or other members are disposed between the tie rods 12 and 22 and the respective wheels w.

Figure 7:
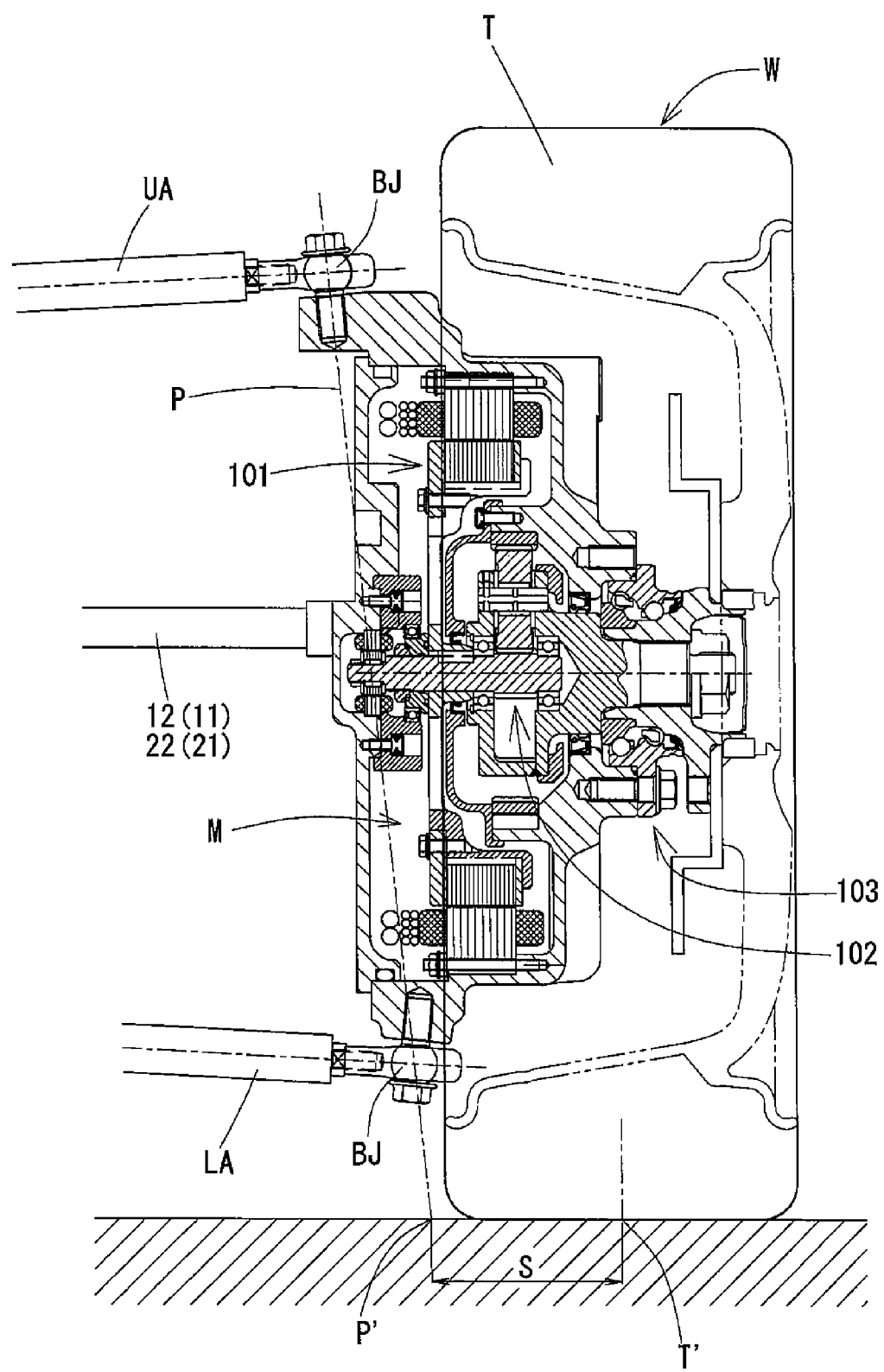
FIG. 7 is a sectional view of a wheel, showing how the wheel is supported.

FIG. 7 shows how each tie rod 12, 22 is connected to the corresponding wheel w, in which is mounted the in-wheel motor M. Any of the wheels w is steerable about a kingpin axis P connecting together the center lines of ball joints BJ provided, respectively, at the distal ends of an upper arm UA and a lower arm LA supported by the vehicle frame. The in-wheel motor M includes a motor main body 101, a speed reducer 102 and a wheel bearing 103 which are arranged in series in this order from the inboard to outboard side of the vehicle. The in-wheel motor M of each wheel w is capable of assisting in the steering of the wheel about the king pin axis P (about which the wheel is steered) by rotating the tire T under the driving force of the in-wheel motor M, if, as shown in FIG. 7, the contact point P' between the kingpin axis P and the ground is not coincident with the center T' of the ground contact area of the tire T (i.e., if the scrub radius is not zero).

Figure 8:
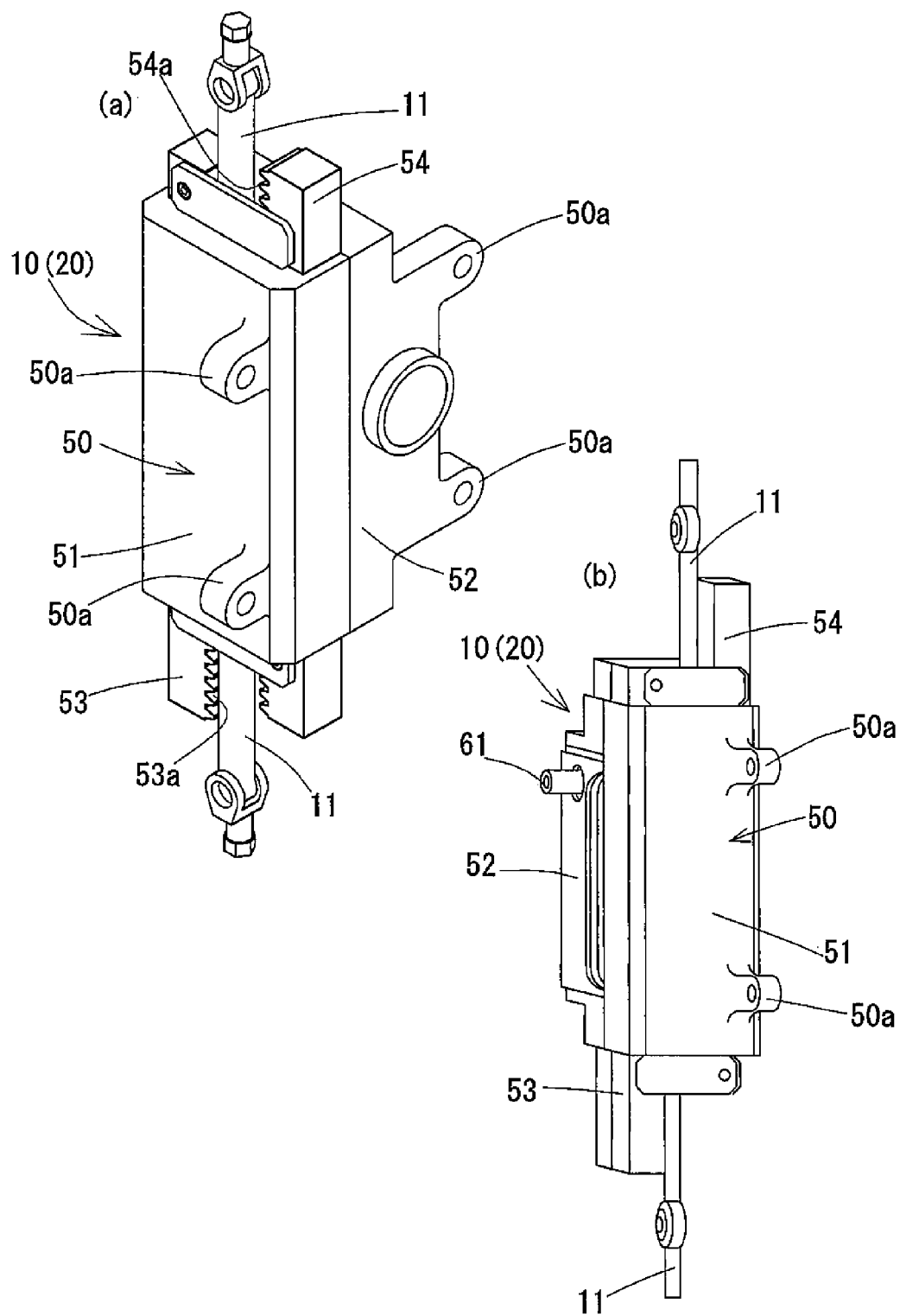
FIGS. 8(a) and 8(b) are, respectively, a perspective view as seen from below, and a perspective view as seen from above, of either of the steering devices shown in FIG. 2.

Now the steering devices 10 and 20 are described in a detailed manner. For each of the steering devices 10 and 20, as shown in FIGS. 8(*a*) and 8(*b*), the first and second rack bars 53 and 54 are mounted in a rack case (steering cylinder) 50 extending in the right-and-left direction of the vehicle relative to the direction in which the vehicle moves in a straight line (fore-and-aft direction of the vehicle). The rack case 50 comprises a front cover 52 and a rear cover 51, and is fixed directly or indirectly to the frame (chassis), not shown, of the vehicle 1 at its flange portions 50*a* by screws or bolts.

While not shown, each steering device 10, 20 includes boots extending from the respective tie rods 12 and 22 to the rack case 50 to prevent entry of foreign substances into the moving parts of the steering device. A first rotary shaft (pinion shaft) 61 is connected to a steering shaft 3 through a steering joint, not shown.

As shown in FIG. 2, when the steering 2 is operated by a driver, the first rack bar 53 and the second rack bar 54 of each steering device 10, 20 can be moved in one of the right and left directions by the same distance, together with each other, directly by the steering wheel 2, or by a normal steering actuator 31 which is actuated when the steering wheel 2 is operated. When the rack bars 53 and 54 are moved in this manner during a normal travel mode, the right and left wheels w are steered in one of the right and left directions.

As shown in FIG. 9(*a*), each of the steering devices 10 and 20 includes a rack bar moving device 60. The rack bar moving device 60 is capable of moving the first and second rack bars 53 and 54, respectively, in one and the other of the right and left directions relative to the direction in which the vehicle moves in a straight line (i.e. the opposite directions in which the rack teeth are arranged) by the same distance.

As shown in FIG. 9(*a*), the rack bar moving device 60 includes first synchronizing gears 55 each meshing with both a synchronizing rack gear 53*a* of the first rack bars 53 and a synchronizing rack gear 54*a* of the second rack bar 54, which faces the synchronizing rack gear 53*a*.

The first synchronizing gears 55 comprise three gears 55*a*, 55*b* and 55*c* that are arranged in the direction in which the rack teeth of the rack gears of the rack bars 53 and 54 extend, and are spaced apart from each other at regular intervals. When the first rack bar 53 is moved in one of the opposite directions in which the rack teeth are arranged under a driving force applied from the rack bar moving device 60, this movement is converted to the movement of the second rack bar 54 in the other (second) of the opposite directions by the same distance as the movement of the first rack bar 53 in the one (first) of the opposite directions.

As shown in FIGS. 9(*a*) and 9(*b*), the rack bar moving device 60 further includes second synchronizing gears 56 comprising gears 56*a* and 56*b* which are disposed between the adjacent first synchronizing gears 55, i.e. between the gears 55*a* and 55*b* and between the gears 55*b* and 55*c*, respectively. The second synchronizing gears 56 are in mesh with neither of the synchronizing rack gear 53*a* of the first rack bar 53 and the synchronizing rack gear 54*a* of the second rack bar 54, and are in mesh with only the first synchronizing gears 55. The second synchronizing gears 56 serve to rotate the three first synchronizing gears 55*a*, 55*b* and 55*c* by the same angle in one same circumferential direction. The second synchronizing gears 56 ensure smooth relative movement between the first rack bar 53 and the second rack bar 54.

Figure 10:
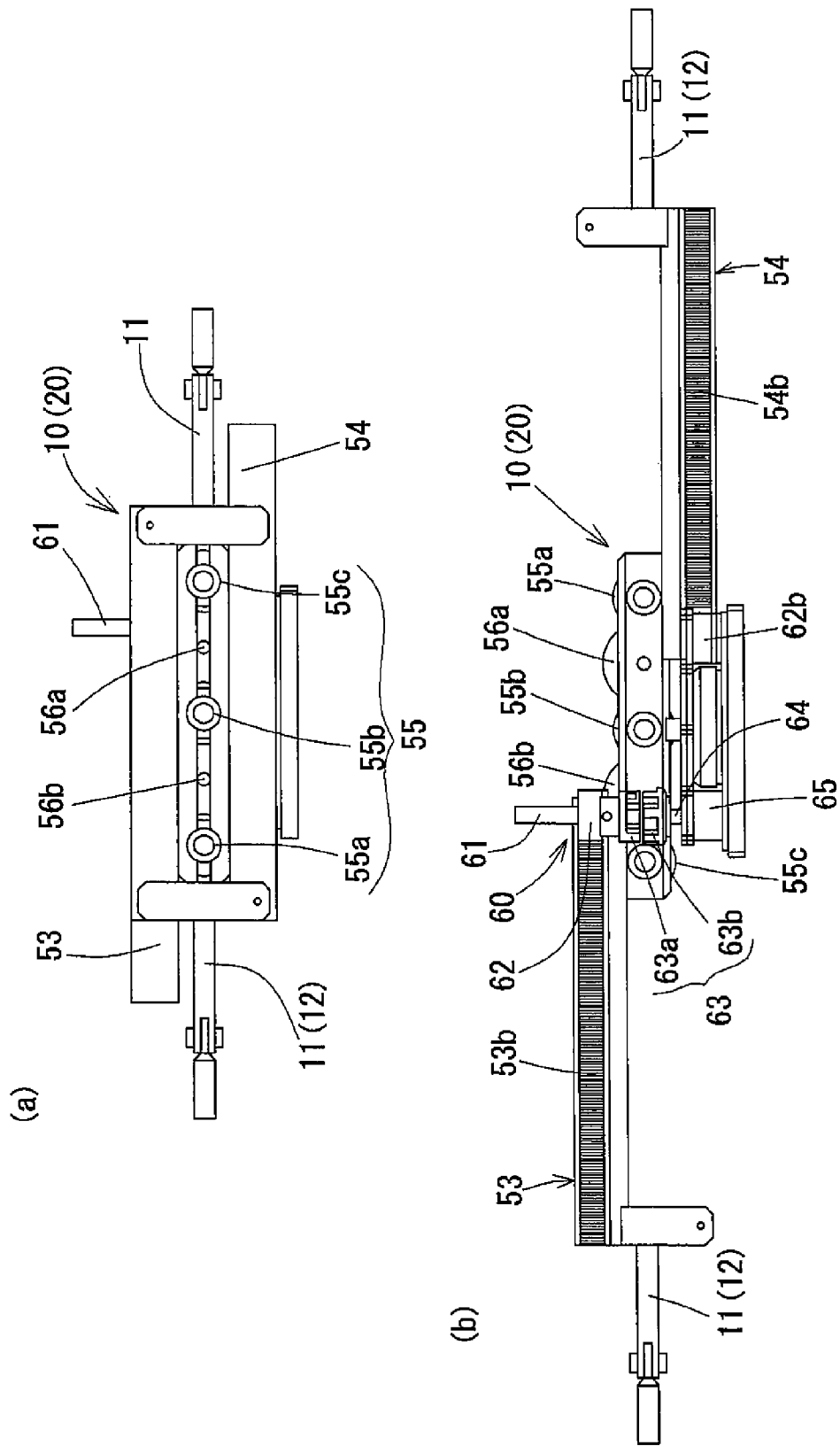
FIGS. 10(a) and 10(b) are back views of either of the steering devices shown in FIG. 2, showing, respectively, the state in which two rack bars are close to each other, and the state in which the two rack bars are open.
Figure 11:
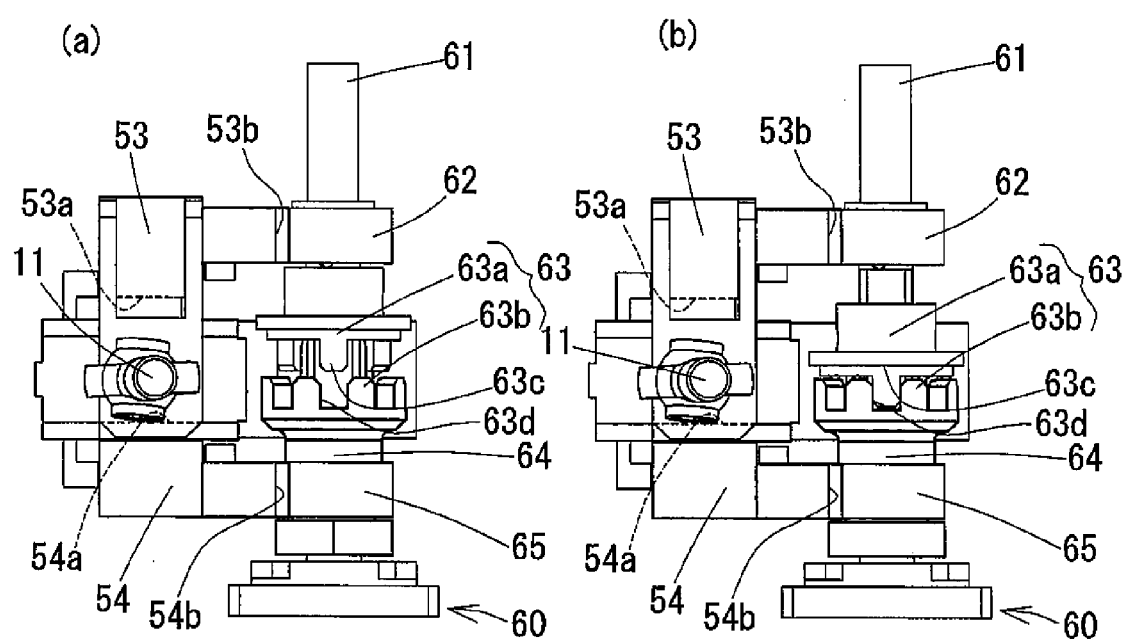
FIGS. 11(a) and 11(b) are side views of either of the steering devices shown in FIG. 2, showing, respectively, the state in which a coupling mechanism is uncoupled, and the state in which the coupling mechanism is coupled.
Figure 12:
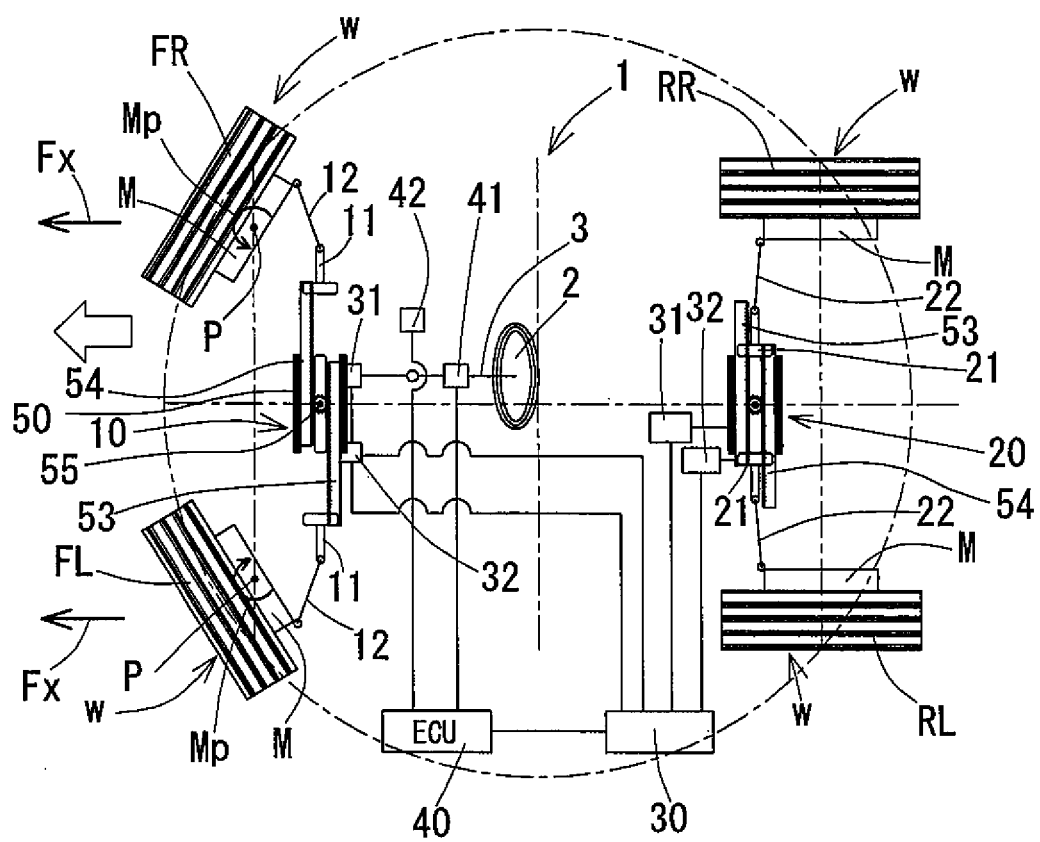
FIG. 12 is a plan view of the vehicle of FIG. 2 in which only the front wheels are moved to a pivot turn mode.

As shown in FIG. 10(*b*), the first and second rack bars 53 and 54 include, besides the synchronizing rack gears 53*a* and 54*a*, steering rack gears 53*b* and 54*b*, respectively. The synchronizing rack gears 53*a* and 54*a* may be formed integral with the respective steering rack gears 53*b* and 54*b*, or may be separate members from, and fixed to, the respective steering rack gears 53*b* and 54*b*.

When the first rack bar 53 is moved from the position shown in FIG. 10(*a*) to the position shown in FIG. 10(*b*) under the driving force applied from the rack bar moving device 60, this driving force is transmitted to the second rack bar 54 through the first synchronizing gears 55, so that the second rack bar 54 is also moved from the position shown in FIG. 10(*a*) to the position shown in FIG. 10(*b*). While the rack bars are being moved in this manner, it is possible to assist in the steering of the wheels w by driving the in-wheel motors M of the respective wheels w to rotate the tires T under the driving forces of the in-wheel motors M. It is also possible to steer the wheels not under the driving force applied from the rack bar moving device 60 but under the driving forces of the in-wheels motors M alone. While the rack bars are moved as shown in FIGS. 10(*a*) and 10(*b*), the below-described coupling mechanism 63 is uncoupled.

After the rack bars 53 and 54 have reached the positions shown in FIG. 10(*b*), the coupling mechanism 63 is coupled. Once the coupling mechanism 63 is coupled, the rack bars 53 and 54 are fixed to each other, so that the rack bars 53 and 54 can be moved in one of the right and left directions by the same distance.

The operation of the rack bar moving device 60 is now described.

The rack bar moving device 60 of the first steering device 10 for the front wheels includes the pinion shaft (first rotary shaft) 61 of the steering device 10 (see FIG. 10(*b*)). The first rotary shaft 61 is directly rotated by the steering wheel 2 when a driver turns the steering wheel 2. However, the rack bar moving device 60 may be configured such that instead of the first rotary shaft 61 being directly rotated by the steering wheel 2 when the driver turns the steering wheel 2, the first rotary shaft 61 is rotated under a driving force of the normal steering actuator 31 of the first steering device 10, which is actuated when the driver turns the steering wheel 2, or under a driving force of a mode switching actuator 32 of the first steering device 10 which is actuated when a mode switching element 42 mounted on the vehicle 1 is operated.

The rack bar moving device 60 of the first steering device 20 for the rear wheels includes the first rotary shaft 61 of the second steering device 20. This rotary shaft 61 is configured to be rotated under a driving force of the normal steering actuator 31 of the second steering device 20, which is actuated when the driver turns the steering wheel 2, or under a driving force of a mode switching actuator 32 of the second steering device 20 which is actuated when a mode switching element 42 mounted on the vehicle 1 is operated. The rack bar moving device 60 further includes a first pinion gear 62 mounted to the first rotary shaft 61 so as to rotate together with the first rotary shaft 61. Rotation is transmitted from the actuating shaft of the normal steering actuator 31 or the mode switching actuator 32 to the first rotary shaft 61 through the steering joint.

Each rack bar moving device 60 includes a second rotary shaft 64 aligned with the first rotary shaft 61, and a second pinion gear 65 mounted on the second rotary shaft 64 so as to be rotatable together with the second rotary shaft 64.

As shown in FIG. 10(b), the first pinion gear 62 is in mesh with the steering rack gear 53b of the first rack bar 53, and the second pinion gear 65 is in mesh with the steering rack gear 54b of the second rack bar 54.

The rack bar moving device 60 includes the coupling mechanism 63. The coupling mechanism 63 is disposed between the first pinion gear 62 and the second pinion gear 65, and is configured to selectively uncouple the first and second rotary shafts 61 and 64 from each other (so that they can rotate relative to each other; see FIG. 11(a)) and couple the shafts 61 and 64 together (so that they cannot rotate relative to each other; see FIG. 11(b)).

As shown in FIGS. 11(a) and 11(b), the coupling mechanism 63 includes a moving part 63a provided on the first rotary shaft 61, and a fixed part 63b provided on the second rotary shaft 64. The coupling mechanism 63 is configured such that when the moving part 63a is pressed against the fixed part 63b, protrusions 63c formed on the moving part 63a are engaged in recesses 63d formed in the fixed part 63b, thereby allowing the rotary shafts 61 and 64 to rotate together. However, conversely to the above, the protrusions 63c may be formed on the fixed part 63b, and the recesses 63d may be formed in the moving part 63a.

The coupling mechanism 63 is further configured such that the moving part 63a can be moved axially away from the fixed part 63b, i.e., axially upwardly in FIGS. 11(a) and 11(b), by an external driving source such as a push solenoid until the fixed part 63b and the moving part 63a are uncoupled from each other, and the first and second rotary shafts 61 and 64, and thus the first and second pinion gears 62 and 65, are uncoupled from each other and become rotatable independently of each other.

In this state, the first pinion gear 62 is in mesh with the first rack bar 53, and the second pinion gear 65 is in mesh with the second rack bar 54. Further, the first synchronizing gears 55 are in mesh with both the first rack bar 53 and the second rack bar 54. Thus, when rotation is transmitted to the first pinion gear 62, and the first rack bar 53 is moved in one of the right and left directions of the vehicle, along which the rack teeth of the first rack bar 53 are arranged, the first synchronizing gears 55 are rotated, and the second rack bar 54 is moved in the direction opposite to the direction in which the first rack bar 53 is moved (the other of the right and left directions) by the same distance. As the second rack bar 54 is moved, the second pinion gear 65 is rotated.

Thus, by selectively coupling together the first and second pinion gears 62 and 65 and uncoupling them from each other by the coupling mechanism 63, it is possible to easily change between the state in which the rack bars 53 and 54 are moved in one of the right and left directions together with each other, and the state in which the rack bars 53 and 54 are separately moved in the opposite directions to each other.

That is, with the first pinion gear 62 and the second pinion gear 65 coupled together through the coupling mechanism 63, when a driver turns the steering wheel 2, the first rack bar 53 and the second rack bar 54 are moved together with each other in one of the right and left directions with respect to the direction in which the vehicle is moved in a straight line by the same distance, under the driving force of the normal steering actuator 31, which is actuated when the steering wheel 2 is operated. As a result, the corresponding right and left wheels w are steered about the respective kingpin axes P (see FIG. 7) in the same direction. At this time, since the first rack bar 53 and the second rack bar 54 are moved together with each other, the first synchronizing gears 55 do not rotate.

On the other hand, when the first pinion gear 62 and the second pinion gear 65 are uncoupled from each other by the coupling mechanism 63, it is possible to move the first rack bar 53 and the second rack bar 54 by the same distance in one and the other of the right and left directions, with respect to the direction in which the vehicle is moved in a straight line, thereby steering the right and left wheels w in opposite directions to each other about the respective kingpin axes P (FIG. 7).

With this arrangement, the rotation of the steering wheel 2 during normal operation is transmitted to the first rotary shaft 61 through the steering shaft 3. The rack bar moving device 60 also serves to move the first rack bar 53 and the second rack bar 54 together with each other during normal operation.

During mode switching, the driving force of the mode switching actuator 32 is transmitted to the respective rack bars 53 and 54 due to rotation of the first pinion gear 62 and the first synchronizing gears 55. While the driving force of the mode switching actuator 32 is being applied to the respective rack bars 53 and 54 through the first pinion gear 62, the rotation of the steering wheel 2 may or may not be transmitted to the steering shaft 3.

The normal steering actuator 31 may have the function of the mode switching actuator 32 too. That is, during mode switching, the rotation of the steering shaft 3 may be transmitted to the first rotary shaft 61 through the normal steering actuator 31.

Now description is made of several travel modes of the vehicle 1 in which the steering devices 10 and 20 are mounted.

(Normal Travel Mode)

With the wheels positioned as shown in FIG. 2, in which the vehicle is supposed to travel in a straight line, the coupling mechanism 63 of the steering device 10 for the front wheels is coupled (as shown in FIG. 11(b)), whereby the first rack bar 53 and the second rack bar 54 are movable together with each other. When the steering wheel 2 is operated in this state, the pair of rack bars 53 and 54 in the rack case 50 mounted to the frame of the vehicle 1 are moved together with each other.

Figure 3:
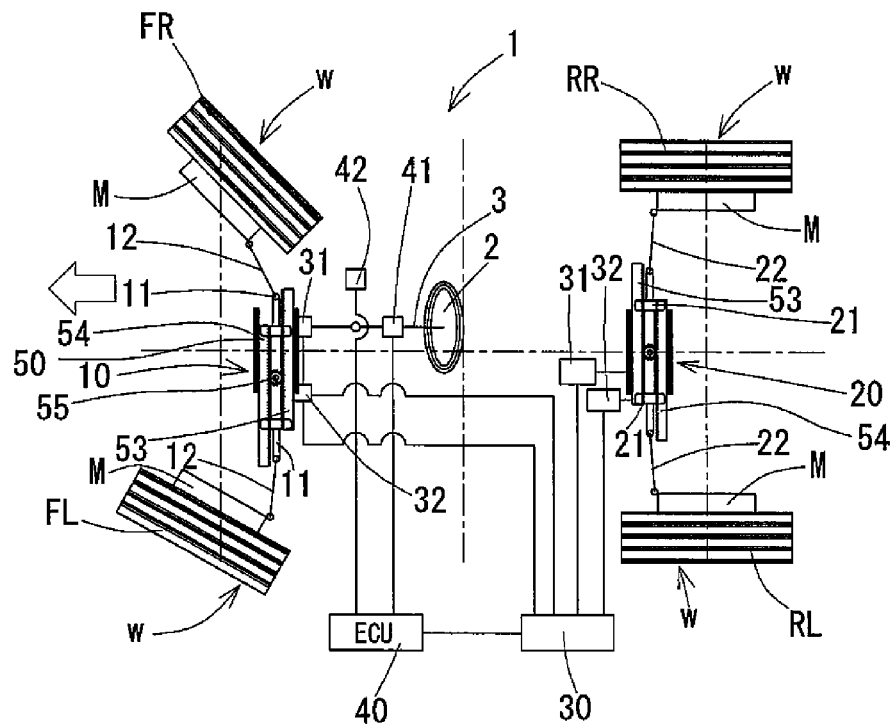
FIG. 3 is a plan view of the vehicle of FIG. 2 during a normal travel mode (normal steering mode).

When the first and second rack bars 53 and 54 of the steering device 10 are moved together with each other in one of the right and left directions with respect to the direction in which the vehicle is moved in a straight line, under the driving force of the normal steering actuator 31 or by operating the steering wheel 2, the front right and front left wheels w are steered by a predetermined angle. FIG. 3 shows the state of the vehicle when the front wheels are steered to the right. That is, by completely fixing the rack bars 53 and 54 to each other, the vehicle 1 can travel in the same manner as ordinary vehicles. During the normal travel mode, when a driver operates the steering wheel 2, the front wheels are steered through the steering device 10 for the front wheels such that the vehicle can travel in a straight line, turn right or left, or travel otherwise according to situations.

(Small Radius Turning Mode)

Figure 4:
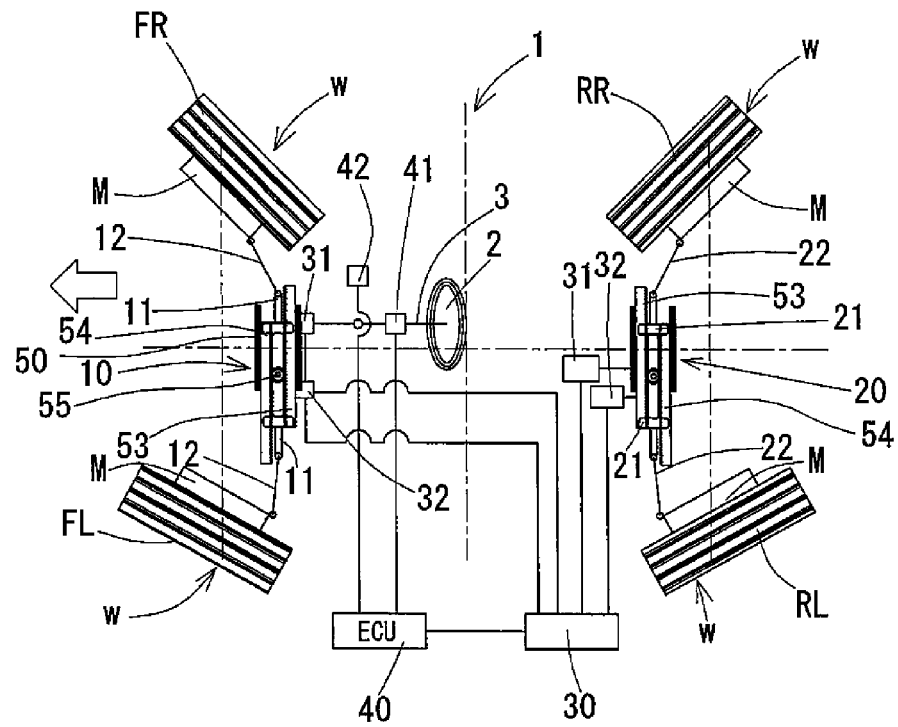
FIG. 4 is a plan view of the vehicle of FIG. 2 during a small-radius turning mode.

FIG. 4 shows a small radius turning mode, in which the first steering device 10 for the front wheels is moved as shown in FIG. 3, and further, the coupling mechanism 63 of the second steering device 20 for the rear wheels are coupled, whereby the first rack bar 53 and the second rack bar 54 of the second steering device 20 are movable together with each other (see FIG. 11(b)). Thus, when the steering wheel 2 is operated, the pair of rack bars 53 and 54 in the rack case 50 of the second steering device 20, which is fixed to the frame of the vehicle, are also moved together with each other in one of the right and left directions of the vehicle 1.

When the first and second rack bars 53 and 54 of the second steering device 20 are moved in one of the right and left directions with respect to the direction in which the vehicle is moved in a straight line under the driving force of the normal steering actuator 31, the rear right and rear left wheels w are steered by a predetermined angle as shown in FIG. 4. At this time, the rear wheels are steered in the opposite direction to the direction in which the front wheels are steered. (In FIG. 4, the front wheels are steered to the right, while the rear wheels are steered to the left.) This allows the vehicle to be turned with a smaller radius than during the normal travel mode. In FIG. 4, the rear wheels are steered in the opposite direction to the direction in which the front wheels are steered by the same angle as the front wheels, but may be steered by a different angle from the angle by which the front wheels are steered.

(Pivot Turn Mode)

Figure 5:
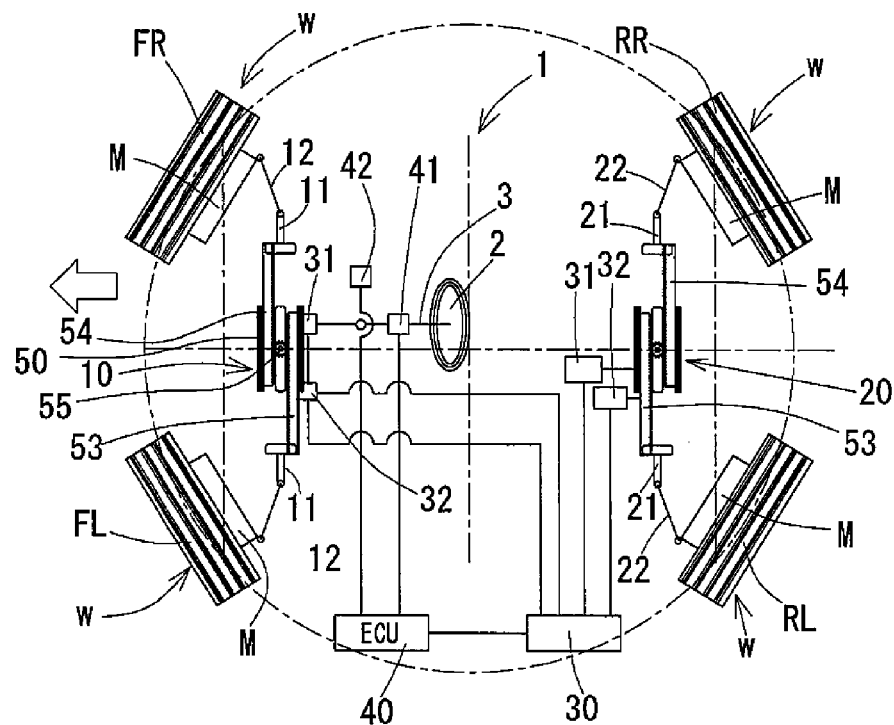
FIG. 5 is a plan view of the vehicle of FIG. 2 during a pivot turn mode.

A pivot turn mode is shown in FIG. 5. In this mode, for each of the steering devices 10 and 20, the coupling mechanism 63 is uncoupled (see FIG. 11(a)), whereby the first rack bar 53 and the second rack bar 54 are movable separately from each other. Thus, when the driving force of the mode switching actuator 32 is applied to the first pinion gear 62, the first rack bar 53 and the second rack bar 54 are moved by the same distance in the opposite directions to each other by the action of the first synchronizing gears 55 disposed between the first rack bar 53 and the second rack bar 54.

The first and second rack bars 53 and 54 of each of the steering devices 10 and 20 are moved in the opposite directions to each other until, as shown in FIG. 5, the center axes of all four wheels w substantially extend to the center of the vehicle, and the coupling mechanisms 63 of the respective steering devices 10 and 20 are coupled in this state. Since the center axes of all four wheels w substantially extend to the center of the vehicle, the vehicle can turn on the same spot with the center of the vehicle remaining unchanged (or substantially unchanged) under the driving forces from the in-wheel motors M mounted in the respective wheels w.

During steering for switching to the pivot turn mode, the tires T are rotated under the driving forces of the in-wheel motors M mounted in the front and rear wheels w to steer the wheels w about the respective king pin axes P. At this time, by simultaneously generating driving forces from the in-wheel motors M of the front and rear wheels w, it is possible to prevent the vehicle from unexpectedly moving forward while switching to the pivot turn mode. When switching from the pivot turn mode to the normal travel mode too, by simultaneously generating driving forces from all of the in-wheel motors M, it is possible to prevent the vehicle from unexpectedly moving backward at this time.

In this mode, the vehicle can be turned on the same spot not by all of the in-wheel motors M mounted in the respective wheels w but by at least one of them.

(Lateral Travel Mode)

Figure 6:
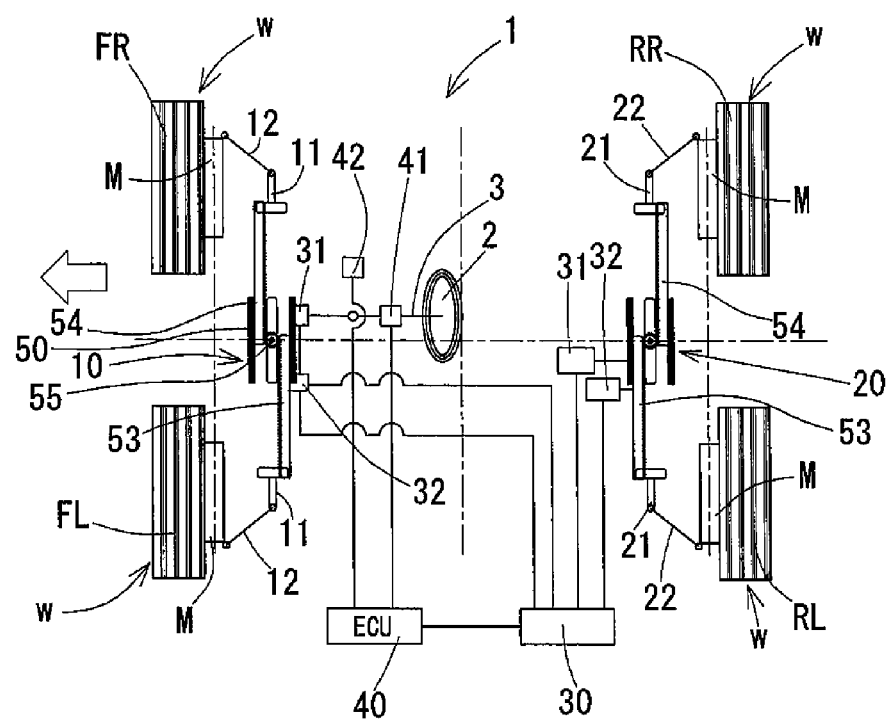
FIG. 6 is a plan view of the vehicle of FIG. 2 during a lateral travel (parallel travel) mode.

A lateral travel mode is shown in FIG. 6. In this mode, as in the pivot turn mode, for each of the steering devices 10 and 20, with the coupling mechanism 63 uncoupled (see FIG. 11(a)), the first rack bar 53 and the second rack bar 54 are moved in the opposite directions to each other such that all of the front and rear wheels w are oriented in the direction perpendicular to the direction in which the vehicle travels in a straight line (right and left direction with respect to the direction in which the vehicle travels in a straight line), by applying a rotational force from the mode switching actuator 32 to the first pinion gear 62. When the wheels w are oriented in the direction perpendicular to the direction in which the vehicle travels in a straight line, the coupling mechanism 63 is coupled (see FIG. 11(b)) to fix the rack bars 53 and 54 in position.

With the coupling mechanism 63 coupled in this manner, the first and second rack bars 53 and 54 can be moved in one of the right and left directions with respect to the direction in which the vehicle travels in a straight line, under the driving force of the normal steering actuator 31 or by operating the steering wheel 2, to finely adjust the directions (tire angles) of the wheels w.

FIG. 6 shows the positional relationship between the steering devices 10 and 20 for the front and rear wheels w, respectively, and the directions of the wheels w, during the lateral travel mode. Compared to the pivot turn mode, the rack bars 53 and 54 protrude laterally outwardly to a larger degree. Thus, in this mode, the connecting points between the tie rods 12 and 22 and the respective wheels w are located at the outermost positions in the width direction of the vehicle. During the lateral travel mode too, it is possible to finely adjust the directions (tire angles) of the wheels w under the driving force of the normal steering actuator 31 or by operating the steering wheel 2.

During steering for switching to the lateral travel mode, the tires T are rotated under the driving forces of the in-wheel motors M mounted in the front and rear wheels w to steer the wheels w about the respective king pin axes P. At this time, by simultaneously generating driving forces from the in-wheel motors M of the front and rear wheels w, it is possible to prevent the vehicle from unexpectedly moving forward while switching to the lateral travel mode. When switching from the lateral travel mode to the normal travel mode too, by simultaneously generating driving forces from all of the in-wheel motors M, it is possible to prevent the vehicle from unexpectedly moving backward at this time.

(Further Travel Mode)

In a further travel mode, when an electronic control unit (ECU) 40 determines that the vehicle 1 is traveling at a high speed, based on an output of the ECU 40, an actuator driver 30 drives the mode switching actuator 32 for the rear wheels such that the rear left and rear right wheels RL and RR are turned from the parallel position so as to be slightly closed at their front ends (toe-in state). This allows stable high-speed travel.

Such toe adjustment may be made based on travel states of the vehicle, such as the vehicle speed and loads on the axles, as determined by the ECU 40, or based on the input from the mode switching element 42, which is provided in the driver/passenger cabin. A driver can switch the travel mode by operating the mode switching element 42. The mode switching element 42 may be a switch, a lever or a joystick operable by a driver.

(Mode Switching)

The mode switching element 42 is also used to switch one of the above travel modes to another. That is, by operating the mode switching element 42, it is possible to select any of the normal travel mode, pivot turn mode, lateral travel mode, small-radius turning mode, etc. Since any travel mode is selectable by operating e.g. a switch, the mode switching can be made safely.

During the normal travel mode, the ECU 40 calculates the necessary moving amount of the rack bars 53 and 54 of the steering device 10 in one of the right and left directions, based on information from a sensor 41 when the steering wheel 2 is operated, and based on the results of calculation, the ECU 40 controls the normal steering actuator 31 for the front wheels, to move, together with each other, the rack bars 53 and 54 received in the rack case 50 in the one of the right and left directions, thereby steering the front right and front left wheels w by necessary angles in a necessary direction.

When, for example, the pivot turn mode is selected by operating the mode switching element 42, it is possible to steer the four wheels w through the steering devices 10 and 20 for the front and rear wheels, respectively, and under the driving forces generated simultaneously from the in-wheel motors M of the front and rear wheels w such that the vehicle 1 turns substantially about the center of the vehicle. This mode is permitted only while the vehicle 1 is at a stop. During the pivot turn mode, the ECU 40 calculates the relative movements of the rack bars 53 and 54 of the respective steering devices 10 and 20, and based on the results of calculation, the ECU 40 controls, through the actuator driver 30, the mode switching actuators 32 for the front and rear wheels, thereby steering the wheels.

When the lateral travel mode is selected by operating the mode switching element 42, it is possible to steer the four wheels w through the steering devices 10 and 20 for the front and rear wheels, respectively, and under the driving forces generated simultaneously from the in-wheel motors M of the front and rear wheels w such that the four wheels w form a steering angle of 90 degrees. At this time, too, the ECU 40 calculates the relative movements of the rack bars 53 and 54 of the respective steering devices 10 and 20. Based on the results of this calculation, the ECU 40 controls, through the actuator driver 30, the mode switching actuators 32 for the front and rear wheels, thereby steering the wheels. The normal steering actuators 31 may be configured, during the lateral travel mode, to be deactivated, or kept activated so that the steering angles can be finely adjusted by the normal steering actuators 31.

When the small-radius turning mode is selected by operating the mode switching element 42, the front wheels and the rear wheels are steered in opposite directions to each other so that the vehicle can turn with a smaller radius. During the small-radius turning mode, the ECU 40 calculates moving amounts of the rack bars 53 and 54 of the steering device 20 for the rear wheels, which are received in the rack case 50, based on e.g. the operation of the steering wheel 2, and based on the results of calculation, the ECU 40 controls, through the actuator driver 30, the normal steering actuator 31 and the mode switching actuator 32 for the second steering device 20 to steer the rear wheels. The first steering device 10 for the front wheels is controlled in the same manner as during the normal travel mode.

As described above, based on the steering angle of the steering wheel 2 when the steering wheel 2 is operated by a driver, the information from the sensor 41, which detects e.g. the steering torque, and/or the input from the mode switching element 42, or based on the travel condition of the vehicle determined by the ECU 40 itself, the ECU 40 calculates necessary moving amounts of the rack bars 53 and 54 of the respective steering devices 10 and 20, and based on the results of calculation, the ECU 40 controls, through the actuator driver 30, the normal steering actuators 31 or the mode switching actuators 32, of the respective steering devices 10 and 20, thereby steering the front and rear wheels in a predetermined direction.

In the embodiment, the second steering device 20 for the rear wheels is controlled by the steer-by-wire configuration, in which the steering operation as well as the operation of the mode switching actuator 32, which are carried out by a driver, are converted to electric signals to steer the wheels.

For the steering device 10 for the front wheels too, the steer-by-wire configuration using the normal steering actuator 31 and the mode switching actuator 32 may be used. In another arrangement, the normal steering actuator 31 for the steering device 10 comprises a motor coupled to a steering wheel 2, which is operated by a driver, or to the steering shaft 3, and configured to assist the manual steering operation by generating torque necessary to move the rack bars 53 and 54 in the right and left directions. In this arrangement, the mode switching actuator 32 for the front wheels is of the same structure as the actuator 32 for the rear wheels.

The first steering device 10 for the front wheels, which is used for steering during the normal travel mode, may be an ordinary steering device using an ordinary mechanical rack and pinion mechanism.

The above-described travel modes are mere examples, and other control modes using the above-described mechanism are feasible.

According to the present invention, in a vehicle including steering devices capable of steering the front right and front left wheels, respectively, in one and the other of the right and left directions, which are opposite to each other, and steering the rear right and rear left wheels, respectively, in said other and said one of the right and left directions. The steering devices for the front wheels and the rear wheels are actuated simultaneously to switch the travel mode. With this arrangement, when switching the travel mode, it is possible to prevent the vehicle from unexpectedly moving forward or backward, thus improving safety of the vehicle 1.

DESCRIPTION OF THE NUMERALS 10, 20. Steering device
12, 22. Tie rod
53, 54. Rack bar
55. Synchronizing gear
60. Rack bar moving means
62. First pinion gear
63. Coupling mechanism
65. Second pinion gear
M. In-wheel motor
w. Wheel

What is claimed is:
1. A vehicle comprising:
a first steering device configured to steer front right and front left wheels of the vehicle, respectively, in one and the other of right and left directions which are opposite to each other;
a second steering device configured to steer rear right and rear left wheels of the vehicle in the other and the one of the right and left directions, respectively, simultaneously when the first steering device is actuated; and
in-wheel motors provided in at least one of each of the front right and front left wheels and each of the rear right and rear left wheels;
wherein the in-wheel motors are configured to be activated to assist in the steering of the respective wheels about king pin axes by rotating the wheels under driving forces of the in-wheel motors while the first steering device steers the front right and the front left wheels, respectively, in one and the other of right and left directions opposite to each other and the second steering device simultaneously steers the rear right and rear left wheels in the other and the one of the right and left directions, respectively.

2. The vehicle of claim 1, wherein each of the first steering device and the second steering device further includes:
- tie rods connected, respectively, to the corresponding right and left wheels so as to move and steer the respective right and left wheels;
- a pair of rack bars connected to the respective tie rods;
- a synchronizing gear meshing with rack teeth of the pair of rack bars and configured such that a movement of a first one of the rack bars in one of the right and left directions is converted to a movement of a second one of the rack bars in the other of the right and left directions; and
- a rack bar moving device configured to move the pair of rack bars in one and the other of the right and left directions, respectively, wherein the rack bar moving device comprises:
- a first pinion gear meshing with the first one of the rack bars;
- a second pinion gear meshing with the second one of the rack bars; and
- a coupling mechanism configured to selectively couple together the first pinion gear and the second pinion gear, and selectively uncouple the first pinion gear and the second pinion gear from each other.

\* \* \* \* \*